Oct. 14, 1958 R. HELL 2,856,459

APPARATUS FOR CONTROLLING FACSIMILE TRANSCEIVERS

Filed Dec. 12, 1957 2 Sheets-Sheet 1

TRANSMITTING TRANSCEIVER

INVENTOR.
RUDOLF HELL
BY
ATT'Y

Oct. 14, 1958 R. HELL 2,856,459

APPARATUS FOR CONTROLLING FACSIMILE TRANSCEIVERS

Filed Dec. 12, 1957 2 Sheets-Sheet 2

RECEIVING TRANSCEIVER

INVENTOR.
RUDOLF HELL
BY
ATT'Y

United States Patent Office 2,856,459

Patented Oct. 14, 1958

2,856,459

APPARATUS FOR CONTROLLING FACSIMILE TRANSCEIVERS

Rudolf Hell, Kiel, Germany, assignor to Dr.-Ing. Rudolf Hell Kommanditgesellschaft, Kiel-Dietrichsdorf, Germany, a German company Application December 12, 1957, Serial No. 702,445

8 Claims. (Cl. 178—69.5)

Figure 1:
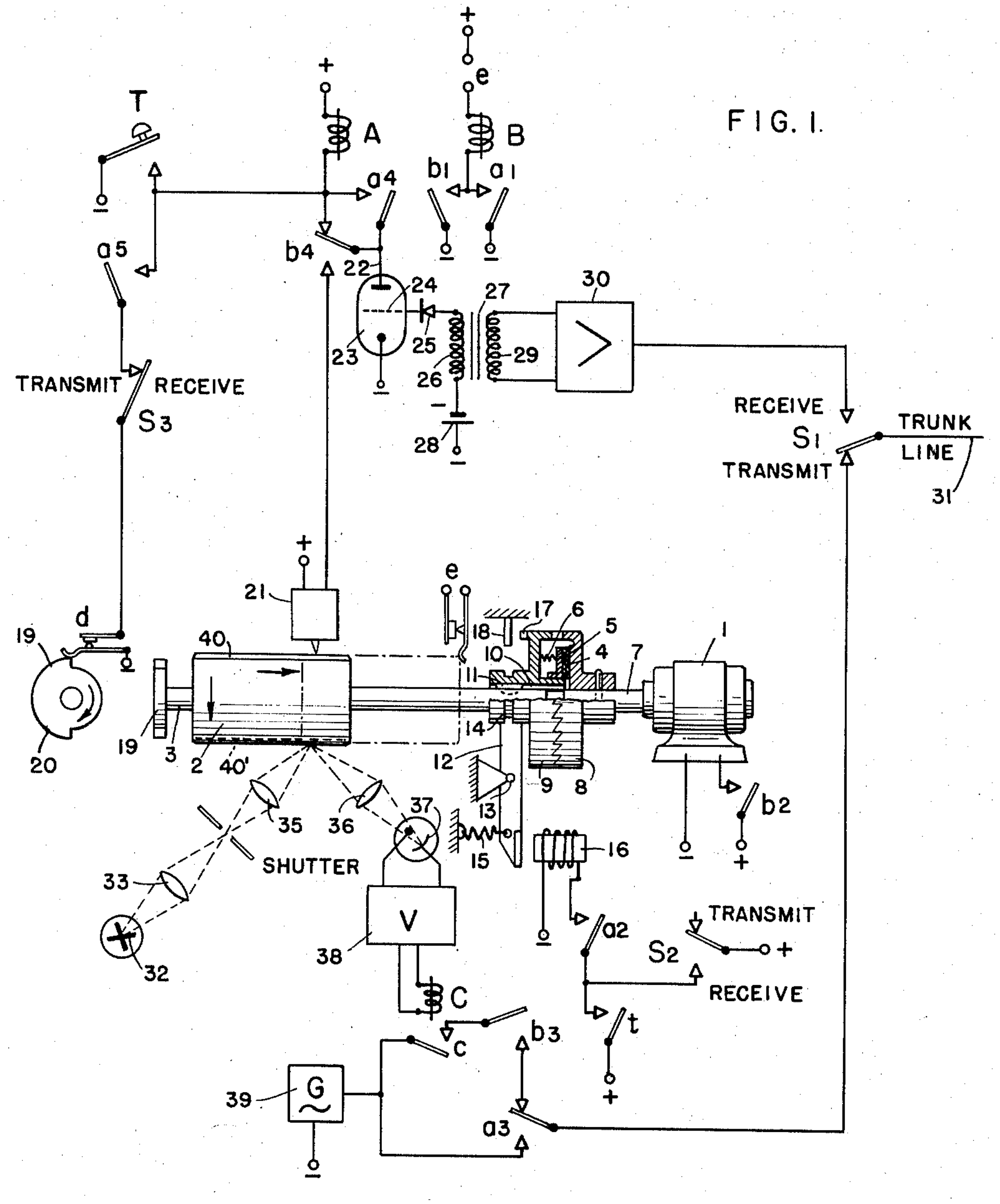

This invention relates to apparatus for controlling facsimile transceivers and is particularly concerned with apparatus for controlling phase-shifted starting of copy-carrying drums in picture or facsimile transceivers provided with scanning and recording devices which are mutually angularly displaced with respect to the corresponding copy drums.

In customary facsimile apparatus which are adapted to function as transmitters as well as in the nature of receivers, so-called transceivers, there are provided scanning and recording devices which either are disposed in front of the picture or copy drum at the identical place or which are exchanged, one for the other, depending upon whether the corresponding apparatus is to be operated as a transmitter or as a receiver. Before beginning the transmission, the transmitter and the receiver drums must be brought into the same initial or starting position.

In the case of transceivers, especially small facsimile and telegram transceivers, it is sometimes for constructional and economic reasons desirable to dispose the scanning and recording devices mutually angularly displaced in front of the surface of the corresponding copy drums. However, in the case of several transceiver apparatus connected for intercommunication, there arises the necessity to place prior to the start of transmission either the copy drum in the transceiver acting as transmitter and the copy drums in the transceivers acting as receivers, into different starting positions, which causes difficulties, or, inasmuch as the transmitting transceiver and the receiving transceivers are structurally completely identical, to cause the copy drums in the receiving transceivers to start somewhat later than the copy drum of the transceiver operating as transmitter, so that the copy seam in the transmitting transceiver is at the start of transmission aligned with the corresponding scanning device while the copy seams in the receiving transceivers are positioned in alignment with the respective recording devices.

According to the invention, the above indicated starting of the copy drum in the transmitting transceiver and the delayed starting of the copy drums in the receiving transceivers is accomplished by causing the transmitting transceiver to transmit a start signal which is transmitted to all receiving transceivers for the purpose of operatively connecting the corresponding drive motors and at the same time causing release of positive clutches, for example, toothed clutches between the corresponding motors and copy drums. The copy drums of all receiving transceivers are thereupon brought into identical start position, by friction clutch means (phasing clutches), with their copy seams aligned with the respective recording devices, in which positions the copy drums are stopped. The positive clutch, for example, toothed clutch in the transmitting transceiver is thereupon operatively actuated, responsive to interruption of transmission of the start signal so as to cause start of rotation of the corresponding copy drum. Switching means are provided, controlled by the copy drum of the transmitting transceiver, which has been started to rotate from its initial position, such switching means taking control of the start signal and maintaining it for an interval required by the copy drum of the transmitting transceiver to rotate through the angular distance between the corresponding recording and scanning devices, whereupon the transmission of the start signal to the receiving transceivers is interrupted. Interruption of the start signal causes in all receiving transceivers operative actuation of the corresponding positive clutches so as to effect positive rotation of the respective copy drums, whereupon transmission can begin.

Figure 2:
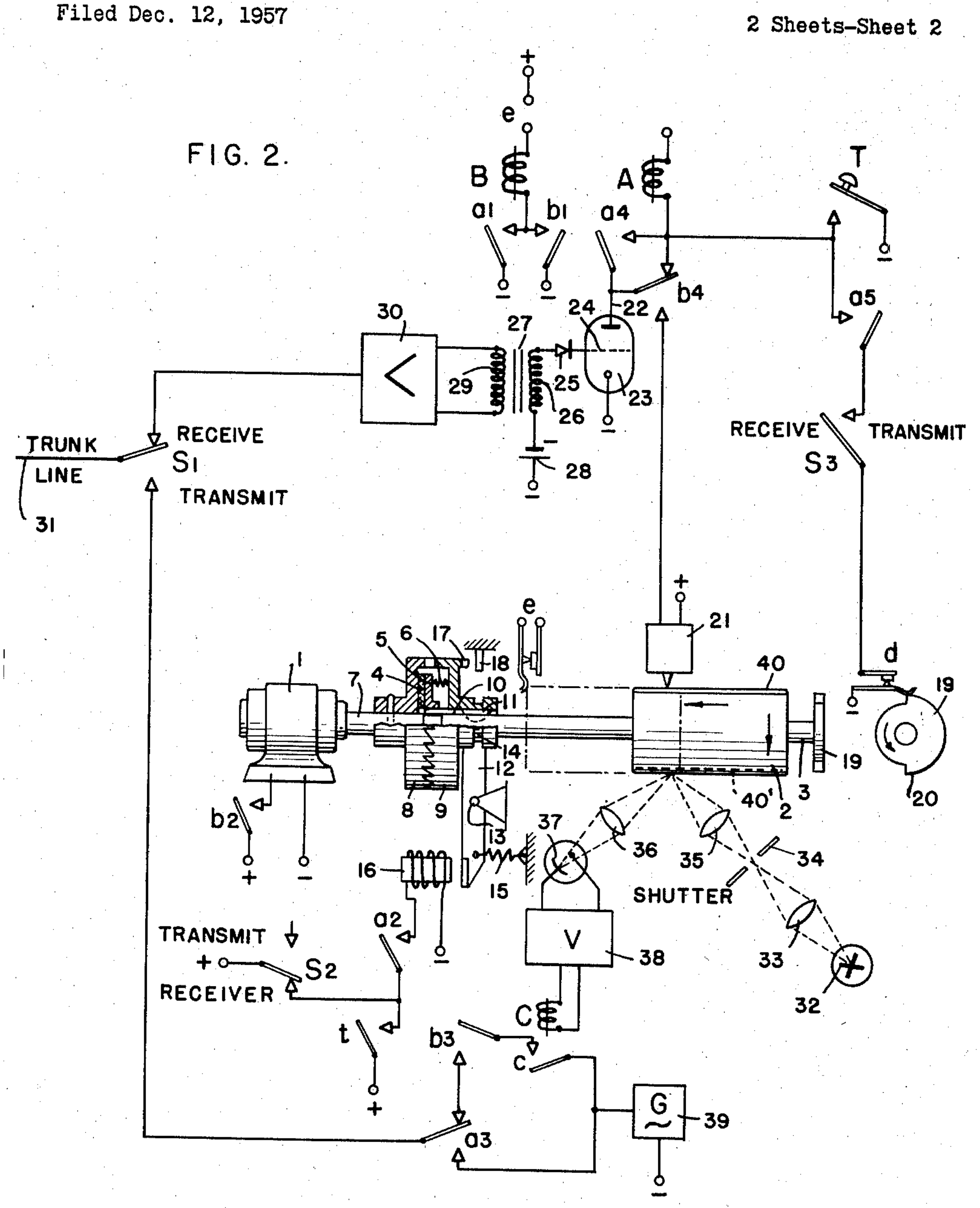

The various objects and features of the invention will be brought out in the description which will be rendered below with reference to the accompanying drawings, in which Fig. 1 shows a transceiver connected for transmission: and Fig. 2 shows a transceiver connected for receiving.

Fig. 1 should be placed at the left of Fig. 2 with the schematically indicated interconnecting line 31 in alignment, line 31 representing, for example, a toll or trunk line leading from the transceiver of Fig. 1 to the transceiver shown in Fig. 2. It is understood, of course, that more than two intercommunicating transceivers may be provided in a given system; only two have been shown for the sake of convenience. Like parts are similarly referenced in Figs. 1 and 2.

Both transceivers are structurally completely identical. Capital letters such as A, B, C indicate relays and corresponding lower case letters such as *a*, *b*, *c* indicate contacts controlled by the corresponding relays. The relay contacts and windings are shown in normal, that is, in non-operated position. The two transceivers differ merely in the different positions of the actuating switches $S_1$, $S_2$ and $S_3$ which are, in Fig. 1, in the "transmit" position and in Fig. 2, in the "receive" position.

The motor 1 of each transceiver drives the copy drum 2, adapted for rotation about the axis 2 and also for axial motion in the direction of the arrow, by means of a positive toothed clutch and a slip or friction clutch disposed in parallel therewith. The friction clutch serving as a "phasing" clutch comprises two friction plates 4 and 5 which are pressed together by means of a spring 6. The friction plate 4 is keyed for rotation with the motor shaft 7 and the friction plate 5 is keyed to the drum shaft 3. The friction or slip clutch is disposed within a generally cylindrical positive tooth clutch comprising two toothed clutch halves 8 and 9. The clutch half 8 is keyed to the motor shaft 7 and the clutch half 9 is disposed for shifting motion upon the shaft 3, by means of a key 11 engaging a groove 10, but is not rotatable about the shaft 3. The clutch lever 12 is journalled for rotation about axis 13 and carries at its upper end, as seen in the drawing, a fork 14 which engages a groove in the hub of the clutch half 9. Its lower end is drawn to the left in Fig. 1 (right in Fig. 2), by means of a spring 15, thereby effecting in normal position of the parts positive clutching engagement of the toothed clutch half 9 with the toothed clutch half 8. Energization of the magnet 16 causes attraction of the lower arm of the clutch control lever 12, thereby effecting release of the positive clutch.

Keyed to the drum shaft 3 is a cam 19 having a rise 20 extending over about 90° up to about 180°, the latter angle being assumed to be provided in the example shown. The cam operates a contact *d* which is periodically opened and closed thereby.

Numeral 21 indicates the recording device or element, for example, an electromagnetic stylus system which may be connected, by means of contact $b_4$, to the plate 22 of a switching or control tube 23, thus receiving current whenever the tube is made conductive. To the grid 24 of the tube is connected negative grid bias over the secondary winding of transformer 27 and rectifier 25, to block the tube in the absence of signals conducted thereto. Numeral 29 indicates the primary transformer winding to which are conducted signals arriving from the line 31, the signals being amplified at 30, when the transceiver is switched to receiving position.

Numeral 32 indicates a source of light which is focused or trained through condenser 33 upon the aperture of a shutter 34. The illuminated shutter aperture is projected over the objective 35 onto the copy carried by the drum 2. The diffused scanning light reflected from the copy is collected by the objective 36 and focused onto the cathode of a photocell 37, thereby producing fluctuating photo currents corresponding to the illumination. These currents are amplified at 38, causing energization of magnet or relay C which controls contact *c* to scan the frequency generator 39, provided that contact $b_3$ is closed and contact $a_3$ is in the alternate operated position.

The scanning device 32—37 is displaced by about 90° to about 180° with respect to the recording device 21, in the example shown, by 180°. The angle between the two devices corresponds to the angle controlled by the cam 20, the cam being oriented with respect to the copy seam 40 so that its upper edge is aligned with the copy seam.

Letter T indicates a start key which controls contact *t*. Actuation of the key T causes starting of the operations of the transmitting transceiver and the receiving transceiver or transceivers. Letters A and B indicate control relays having contacts respectively indicated at $a_1$—$a_5$ and $b_1$—$b_4$, which control the switching operations incident to the starting and during the facsimile transmission. At $S_1$—$S_3$ are shown switches for placing the respective transceivers in "receive" and in "transmit" position. As has already been mentioned, the transceiver shown in Fig. 1 is switched to "transmitting" and the transceiver shown in Fig. 2 is switched to "receiving." At *e* is indicated a terminal contact which is opened by the corresponding drum at the termination of transmission to interrupt the current supply to relay B.

The operations incident to transmitting (Fig. 1) are as follows:

The control switch is actuated to place contacts $S_1$—$S_3$ to transmit position in which they are shown in Fig. 1. The copy drum 2 (a copy to be transmitted being assumed to be mounted thereon) is moved to the left to align the right hand end thereof with the scanning device 32—37. Upon actuation of the start key T, relay A will be energized, closing at contact $a_1$ a circuit for the energization of relay B, the latter closing a holding circuit for itself at contact $b_1$. Contacts *t* and $a_2$ are closed at the same time, causing energization of clutch control magnet 16, therefore, counter-clockwise displacement of clutch lever 12 and consequently release of the positive drive clutch 9, 8. Relay B also closes contact $b_2$ to complete a circuit for the motor 1 and the latter starts to operate. The positive drive clutch 9, 8 has been released responsive to actuation of magnet 16, and rotation of the motor shaft 7, therefore, will not effect positive rotation of the copy drum 2. However, the friction clutch 4, 5 is now operative to rotate the copy drum 2 in the direction indicated by the arrow until the ear 17 engages the stop 18, stopping further rotation of the drum 2. In this initial or start position, the copy seam 40 will be aligned with respect to the recording device 21.

The starting key must be depressed for about 1 second so as to provide an interval of sufficient length for the execution of the operations described. Relay A, upon energizing also actuates its contact $a_3$, thereby closing the circuit for scanning the frequency generator 39, consequently transmitting the start signal over the trunk or toll line 31 to the receiving transceiver or transceivers. Closure of contact $b_3$, responsive to actuation of relay B, prepares a circuit to the generator 39 which will be closed over contact *c* responsive to actuation of magnet C. Contacts $a_4$ and $b_4$ are likewise closed due to actuation of relays A and B and the plate 22 of the tube 23 is accordingly connected to the winding of relay A and to the recording device 21. Closure of contact $a_5$ connects relay A with contact *d* which has just been closed by the cam 20, with the drum 2 being positioned in its initial or start position. The switch $S_3$ is of course in the illustrated position for "transmitting."

Upon release of the key T, relay A will be held operated in the circuit extending by way of contact $a_5$, switch $S_3$ and contact *d*. Contact *t* opens, interrupting the circuit for magnet 16 which releases, allowing the spring 15 to move the clutch lever 12 to normal and thereby effecting clutching of the toothed clutch halves 9 and 8. The ear 17 disengages the stop 18 and the drum 2 immediately starts rotating. The start signal is now maintained by cam controlled contact *d* until the drum 2 has rotated far enough, in the assumed example 180°, to dispose the copy seam 40 in alignment with the scanning means 32—37. Cam 20 opens at such instant the contact *d*, causing deenergization of relay A and consequently opening of all contacts controlled thereby. Restoration of contact $a_3$ to the position in which it is shown causes interruption of the start signal that had been transmitted to the receiving transceiver.

The transmission of the copy content starts instantaneously after the copy seam 40 has passed the scanning means 32—37 in the position 40', that is, relay C energizes and deenergizes in accordance with the scanned copy signals black-white, and contact *c* correspondingly closes and opens the circuit extending to the generator 39, thereby causing transmission of frequency pulses over the trunk or toll line 31. Upon termination of transmission, contact *e* will be opened by the drum 2, causing relay B to release, such relay opening contact $b_2$ to disconnect the current supply to the motor.

The operations incident to receiving (Fig. 2) are as follows:

The switch contacts $S_1$—$S_3$ are normally in "receive" position and the copy drum 2 is normally disposed with its left end facing the recording means 21.

The start signal transmitted from the transceiver which is about to transmit (continuous frequency from generator 39 by way of contact $a_3$ in Fig. 1) is received over the trunk line 31 and conducted to the amplifier 30. The amplified start signal is conducted over the transformer 27 and, after being rectified at 25, to the grid 24 of the tube 23, thereby changing the bias and causing the tube to become conductive. Relay A now receives current by way of contact $b_4$ and energizes, closing its contacts $a_1$—$a_5$. Relay B energizes in a circuit closed over contact $a_1$ and remains energized in a holding circuit closed by contact $b_1$. Clutch control magnet 16 energizes in a circuit extending over contacts $S_2$ and $a_2$ to actuate clutch lever 12 which releases the toothed clutch half 9 from clutching engagement with the toothed clutch half 8, thus disengaging the positive clutch between the motor shaft 7 and the drum shaft 3. The motor 1 is switched-in at contact $b_2$ and starts rotating the shaft 7. The slip or friction clutch 4, 5 is now effective to rotate the drum 2 into its receiving start position with the copy seam 40 (copy paper being assumed to have been placed on the drum) facing the recording means 21, in which position the drum is stopped by engagement of the ear or extension 17, carried by the positive clutch half 9, with the stop 18.

Closure of contacts $a_4$ and $b_4$ extends the plate circuit 22 of the tube 23 to the relay A and to the recording means 21, respectively. The start signal (continuous frequency from generator 39 of the transceiver Fig. 1 which is about to transmit) is thus conducted to the recording means 21 but has no effect because the drum 2 in the receiving transceiver Fig. 2 is stopped. Contact $b_3$ is closed and contact $a_3$ is in actuated position (relays A and B energized) and the generator 39 (Fig. 2) is accordingly connected through to the switch contact $S_1$ which, however, has no effect because switch $S_1$ is in "receive" position and the generator frequency therefore cannot be transmitted over the trunk line 31. Contact $a_5$ is closed but switch contact $S_3$ is likewise in "receive" position and relay A therefore cannot be held energized from cam controlled contact *d* in the initial or start position of the drum 2.

As described before, when the starting key T, in the transceiver Fig. 1 which is about to transmit, is released, the corresponding drum 2 will start to rotate; however, the start signal to the receiving transceiver or transceivers will persist over contact $a_3$ due to continuous energization of relay A from cam controlled contact *d* (Fig. 1), until the copy drum 2 of the transmitting transceiver has rotated by 180° to place the copy seam 40 into position 40', in alignment with the scanning means 32—37 (Fig. 1) when the transmission of the start signal is interrupted by opening of contact $a_3$ responsive to deenergization of relay A.

Interruption of the transmission of the start signal restores the negative grid bias supplied by the current source 28 in the receiving transceiver (Fig 2) and the tube 23 accordingly cuts off, thus causing release of relay A and consequently restoration of all contacts controlled thereby.

Opening of contact $a_2$ causes release of the clutch control magnet 16, therefore, release of the clutch lever 12 and consequently operative engagement of the positive clutch 8, 9, resulting in start of rotation of the copy drum 2 in Fig. 2.

It will be seen from the above described operations, that the start of rotation of the copy drum 2 in the receiving transceiver (Fig. 2) is delayed by a time interval required by the copy drum 2 in the transmitting transceiver (Fig. 1) to rotate through the angular distance (about 180°) between the corresponding recording and scanning means.

Transmission of the copy contents on the drum 2 in the transmitting transceiver (Fig. 1) begins at the instant of start of rotation of the copy drum 2 in the receiving transceiver (Fig. 2). The received copy signals are amplified at 30 and cause the tube to become alternately conductive and to cut off in accordance with the signals received which signify respectively black and white copy content. The recording system 21 receives current from the plate circuit of tube 23 by way of contact $b_4$ when the tube is conductive and records the corresponding signals upon the copy paper mounted on the drum 2. Relay B restores upon termination of transmission due to opening of contact *e* which is controlled by the copy drum 2 and stops motor 1 by opening its contact $b_2$.

Changes may be made within the scope and spirit of the appended claims in which is defined what is believed new and desired to have protected by Letters Patent.

I claim:

1. In a facsimile system employing intercommunicating transceivers each having means for scanning recordings carried by a copy mounted on a rotatable motor-driven drum and means for transmitting signals corresponding to the scanned copy contents, when operating as a transmitter, and each having means for receiving signals from a transmitting transceiver and means for recording said signals upon a copy medium mounted on the motor-driven rotatable drum, to reproduce the corresponding copy contents, when operating as a receiver, said scanning and said recording means being in each transceiver angularly displaced and facing the corresponding copy drum; apparatus under control of a transmitting transceiver for controlling the phase-shifted start of rotation of the copy drums from any initial position thereof, said apparatus comprising, in each transceiver, positive clutch means and friction clutch means, respectively, for clutching the corresponding copy drum for rotation by the respective motor means, means for transmitting from the transmitting transceiver a start signal to the receiving transceivers prior to transmission of the signals corresponding to the copy contents to be transmitted, means responsive to said start signal for starting the motor drive means in all transceivers and for simultaneously disengaging the corresponding positive clutch means while making said friction clutch means operatively effective to cause rotation of the copy drums in all transceivers so as to place such copy drums into identical initial position with the copy seam aligned with the respective recording means, means for stopping said copy drums in said initial position, means for interrupting said start signal in the transmitting transceiver, means responsive to such interruption of the start signal for effecting clutching engagement of the positive clutch means in the corresponding transmitting transceiver to cause start of positive rotation of the respective copy drum, circuit means controlled by said copy drum upon starting positive rotation for maintaining transmission of said start signal to the receiving transceivers for an interval required by the copy drum of the transmitting transceiver to rotate through the angular distance between the recording and the scanning means thereof whereupon the transmission of said start signal is terminated, means operative in said receiving transceivers responsive to termination of transmission of said start signal for effecting clutching engagement of the corresponding positive clutch means to cause positive rotation of the respective copy drums, means for thereafter transmitting from the transmitting transceiver signals to the receiving transceivers corresponding to the scanned copy contents to cause recording of such contents.

2. A system and cooperation of parts according to claim 1, comprising a cam rotatable with said copy drum and carrying a segment-like rise extending through an angle corresponding to the angular distance between the positions of the scanning and recording means of the corresponding transceiver, said cam controlling said circuit means by a contact governed thereby.

3. A system and cooperation of parts according to claim 2, wherein said cam is oriented with respect to the corresponding copy drum with one edge of the rise thereof in alignment with the seam of the copy mounted thereon.

4. A system and cooperation of parts according to claim 2, wherein said circuit means comprises a control relay, means for initially energizing said control relay, a frequency generator, a trunk line extending between said transceivers, a first contact governed by said control relay for connecting said generator with said line to transmit said start signal to the receiving transceivers, a second contact governed by said control relay for connecting its winding with the contact controlled by said cam, said latter contact maintaining said control relay energized, to maintain transmission of said start signal to said receiving transceivers for an interval as specified.

5. A system and cooperation of parts according to claim 2, wherein said positive clutch means comprises two separable toothed clutch parts, said friction clutch means comprising two friction clutch parts disposed within said positive clutch means and enclosed by the clutch parts thereof when said parts are in clutching engagement.

6. A system and cooperation of parts according to claim 2, wherein said positive clutch means comprises two separable toothed clutch parts, said friction clutch means comprising two friction clutch parts disposed within said positive clutch means and enclosed by the clutch parts thereof when said parts are in clutching engagement, a pivoted clutch control lever for governing one of the clutch parts of said positive clutch means, a magnet for controlling the operation of said lever, a relay for controlling the circuit of said magnet, and switch means for initially energizing said relay and for closing said circuit.

7. A system and cooperation of parts according to claim 2, wherein each transceiver comprises first switch means for controlling said circuit means when the corresponding transceiver is connected for transmission, second switch means for controlling the operation of said clutch means when the corresponding transceiver is connected for receiving, and third switch means for interconnecting said signal transmission means of a transmitting transceiver with receiving means of a receiving transceiver.

8. A system and cooperation of parts according to claim 4, comprising a second control relay, contact means controlled by said second control relay and disposed in the circuit for transmitting said signals which correspond to the scanned copy contents to said receiving transceivers, and contact means controlled by said copy drum for restoring said second control relay upon termination of signal transmission.

No references cited.